(12) United States Patent
Paulus

(10) Patent No.: US 6,612,532 B1
(45) Date of Patent: Sep. 2, 2003

(54) SUSPENDED NOTE CLIP

(76) Inventor: Bruce Paulus, P.O. Box 276, Watts, OK (US) 74964

( * ) Notice: Subject to any disclaimer, the term of this patent is extended or adjusted under 35 U.S.C. 154(b) by 0 days.

(21) Appl. No.: 10/133,282

(22) Filed: Apr. 26, 2002

(51) Int. Cl.[7] .................................................. A47F 5/08
(52) U.S. Cl. ................... 248/317; 248/316.7; 248/467; 248/206.5; 24/303; 24/67.11
(58) Field of Search ............................... 248/316.7, 317, 248/467, 206.5; 24/327, 303, 547, 546, 67.11

(56) References Cited

U.S. PATENT DOCUMENTS 1,301,885 A * 4/1919 Tobiason et al. ............. 24/537
3,911,926 A * 10/1975 Peters ......................... 606/158
4,192,315 A * 3/1980 Hilzinger et al. ............ 606/158
4,943,298 A * 7/1990 Fujita et al. ................. 606/158

* cited by examiner

Primary Examiner—Leslie A. Braun
Assistant Examiner—Ingrid Weinhold
(74) Attorney, Agent, or Firm—Michael I Kroll

(57) ABSTRACT

A suspended note clip for magnetic attachment to vertical surfaces has opposing portions that are squeezable to open substantially planar faces that are otherwise biased together, in grasping fashion, by the bowed shape of the opposing portions. The clip is also usable without attachment to the vertical surface and in non-magnetic attachments to vertical surfaces.

8 Claims, 8 Drawing Sheets

SUSPENDED NOTE CLIP

BACKGROUND OF THE INVENTION

1. Field of the Invention

The present invention relates generally to clips and, more specifically, to note clips used for the purpose of suspending and securing messages, notes or small items.

2. Description of the Prior Art

There are other note clip devices designed for securing items. Typical of these is U.S. Pat. No. 186,314 issued to Davis on Jan. 16, 1877.

Another patent was issued to Ferguson, et al. on Feb. 9, 1886 as U.S. Pat. No. 335,907. Yet another U.S. Pat. No. 742,892 was issued to McGill on Nov. 3, 1903 and still yet another was issued on Mar. 26, 1985 to Ohminato et al. as U.S. Pat. No. 4,506,416.

Another patent was issued to Morrish et al. on Nov. 7, 1989 as U.S. Pat. No. 4,878,276. Yet another U.S. Pat. No. 4,949,435 was issued to Michelson on Aug. 21, 1990. Another was issued to Link on Nov. 12, 1991 as U.S. Pat. No. 5,063,640 and still yet another was issued on May 3, 1994 to Clayton et al. as U.S. Pat. No. 5,307,579.

Another patent was issued to Froehlich et al. on Jul. 19, 1994 as U.S. Pat. No. 5,329,672. Yet another U.S. Pat. No. 5,535,486 was issued to Cabili on Jul. 16, 1996. Another was issued to Gish on Aug. 12, 1997 as U.S. Pat. No. 5,655,266 and still yet another was issued on Nov. 14, 2000 to Khon as U.S. Pat. No. 6,145,799.

U.S. Pat. No. 186,314

Inventor: William S. Davis

Issued: Jan. 16, 1877

The invention relates to improvements in cloths pins and is constructed from a single wire frame.

U.S. Pat. No. 335,907

Inventor: James R. Ferguson, et al.

Issued: Feb. 9, 1886

The invention relates to a device for holding book leaves, paper and bills having a bracket, and clamp formed of spring wire.

U.S. Pat. No. 742,892

Inventor: George W. McGill

Issued: Nov. 3, 1903

The invention is a spring clip fashioned from a single piece of wire for securing paper like articles.

U.S. Pat. No. 4,506,416

Inventor: Kiyoshi Ohminato et al.

Issued: Mar. 26, 1985

A paper clip characterized in that it is substantially formed of a hard synthetic resin such as hard vinyl chloride, and in that an arched movable member, a bottom plate and a connector plate are formed as one piece capable of being extruded in its entirety, and the paper-engaging end of said movable member and the central portion of said connector plate are formed of a soft synthetic resin such as soft vinyl chloride.

U.S. Pat. No. 4,878,276

Inventor: Peter Morrish et al.

Issued: Nov. 7, 1989

A spring clip, particularly for use as a peg for suspending clothes from a crossbar of a hanger, has a bar-engagement clip lying between a fulcrum for pivoting movement of a pair of levers and a nip formed by one end of the pair of levers. A U-shaped spring urging those ends together has arms the outer surfaces of which lie flush with outer surfaces of the levers to form substantially flat side surfaces. The clip is integral with the spring. The ends of the arms of the spring may engage the levers by a snap-fit. The flat side surfaces may be used for the adhesive attachment of alternative mounting means for the clip, such as a double-sided adhesive pad.

U.S. Pat. No. 4,949,435

Inventor: Gary K. Michelson

Issued: Aug. 21, 1990

An improved paper clip is disclosed consisting of a single piece of wire bent so as to have a straight top spine portion, two straight side leg portions substantially perpendicular to each end of the top spine portion and bent portions extending from, each side leg portion diagonally at approximately 45 degrees in the direction of the top spine portion. Each bent end portion extends from more than ½ the diagonal distance from the end of the side leg portion to the top spine portion.

U.S. Pat. No. 5,063,640

Inventor: Charles Link

Issued: Nov. 12, 1991

A paper clip for securing to at least one sheet of thin material comprises a continuous or endless filament shaped to provide two oppositely facing pincers. Each oppositely facing pincer has a resilient hinge region connecting and urging together an opposing pair of pincer finger members with each pincer finger member comprising a tip segment, an inner gripping segment, and an outer edge segment. The sheet of thin material is secured between either of the oppositely facing pincers by the inner gripping segments of the respective pair of opposing pincer finger members.

U.S. Pat. No. 5,307,579

Inventor: Theodore H. Clayton, et al.

Issued: May 3, 1994

An electrostatic and magnetic holder for paper, signs and the like wherein the holder is mounted upon glass or similar dielectric surfaces by electrostatic attraction. The holder includes an electrostatically attractable flexible base, and a folded clip section also preferably formed of flexible electrostatic material which is attached to the base either by electrostatic attraction, heat sealing or an adhesive. The clip section includes a pair of opposed magnets, one of the magnets being mounted upon a movable flap whereby the magnets may move relative to each other, and a thin article such as paper, or paper signs, may be gripped between the magnets for support by the holder.

U.S. Pat. No. 5,329,672

Inventor: Linda Froehlich et al.

Issued: Jul. 19, 1994

Improved paper clip is formed from a single piece of spring-quality metal wire to have an elongated U-shaped inner loop nested within an elongated U-shaped outer loop. Each loop includes a free leg and a connector leg; the longitudinally-extending leg portions of the free leg and connector leg of each respective loop are of substantially the same length. The U-shaped loops are joined together by an arcuately-curved interconnector extending between the connector leg of each loop. Distal ends of the free leg of each loop are located contiguous to such arcuately-curved interconnector which defines one longitudinal end of the paper clip; with such new configurational and other features, damage to outer surfaces of stacked paper by such distal ends is avoided and clasping force is applied along substantially the full length of such free legs during use of the improved clip.

U.S. Pat. No. 5,535,486

Inventor: Camilo P. Cabili

Issued: Jul. 16, 1996

This invention is about a spring-wire paper clip formed in a single plane without any overlapping of its parts, with a stronger hold because of the unique configuration of its inner frame whose left leg, instead of moving straight downward curves inward to the right, diagonally, where it joins the right leg of the outward frame, both moving straight down parallel and close to each other in forming a stronger gripping engagement on papers. This unique inner frame also makes possible a novel positioning of the inner frame's end portion underneath and hooded by its own uppermost loop, which together with the outer frame's end portion positioned close to the very top of the clip, practically eliminates any damage to paper held. The unique inner frame also makes it possible for manufacturers to select the strength of the clip's hold, without having to radically change its configuration, to use less wire, and to make slimmer or smaller clips which occupy less space at the left corner. This clip is manufactured and handled by the user in much the same way as the currently popular Gem-type of spring-wire paper clips.

U.S. Pat. No. 5,655,266

Inventor: Donald Gish

Issued: Aug. 12, 1997

A paper clip formed of a single resilient wire that can torsionally grasp a thick sheaf of papers without deforming and can be used either along the straight sides of the paper or at a corner.

U.S. Pat. No. 6,145,799

Inventor: Trinh Cam Khon

Issued: Nov. 14, 2000

A device that incorporates magnetic componentry frictionally engage one or more sheets of paper therebetween is provided. The magnetic componentry of the invention is selected to exert sufficient magnetic force therebetween to retain the paper. The invention includes a magnetic backing member and a ferromagnetic retaining clip rotatably coupled thereto for frictionally engaging paper therebetween. The retaining clip may have an upturned end to facilitate disposing paper between the clip and backing member. The backing member and retaining clip are selected so that the backing member exerts just enough magnet force on the retaining clip to draw the clip against the backing member with enough pressure to retain up to several thin sheets of paper therebetween.

While these clips may be suitable for the purposes for which they were designed, they would not be as suitable for the purposes of the present invention, as hereinafter described. The note clip device of the present invention is constructed of thin metal formed to function like a spring, having a loop hole formed at the top most distal end, a cross over portion in the middle section of the spring consisting a notched out portion on one side of the spring where the other side of the spring passes through and is confined until expanded and a clip portion at the other distal end of the clip. The cross over spring action will allow the user to clip notes or small objects securely.

SUMMARY OF THE PRESENT INVENTION

A primary object of the present invention is to provide an improved note clip.

Another object of the present invention is to provide an improved note clip constructed of thin metal.

Yet another object of the present invention is to provide an improved note clip formed to function like a spring.

Still yet another object of the present invention is to provide an improved note clip having a loophole for the attachment to a hinge attached to a magnetic base.

Another object of the present invention is to provide a clip with a cross over portion in the middle section of the clip having a notched out area on one side of the clip front and rear portions allowing for the other side of the clip spring to intersect and be mated.

Yet another object of the present invention is to provide a note clip whereas the clip portion is attached to a magnet by means of a hinge and capable of attaching to metal surfaces.

Still yet another object of the present invention is to provide a note clip that can be used with or without the magnet attached to the clip.

Additional objects of the present invention will appear as the description proceeds.

The present invention overcomes the shortcomings of the prior art by providing an improved note clip constructed of thin metal, formed to function like a spring. A clip with a cross over portion in the middle section of the clip has a notched area on the front and rear portions of the clip allowing for the other side of the clip spring to intersect and be mated. The clip portion is attached to a magnet by means of a hinge and is capable of attaching to metal surfaces.

The cross over spring action allows the user to clip notes or small objects securely. The note clip is attached to a magnet by means of a hinge passing through the hinge blocks on the magnetic base. The clip may be used with or without the magnet portion and can be applied to a variety of surfaces.

There is a provided a clip for grasping one or more paper sheets, the clip pivotally suspended on a generally horizontal member attached to a base attached to a vertical surface, comprising: a loop positioned about the horizontal member; a front member descending from the loop having: a first downward extension; a resilient body section, the body section being bowed frontwardly, the body section having a notch; and a second downward extension having a substantially planar front surface; a rear member descending from the loop having: a first downward extension, substantially opposite the front member first downward extension; a resilient body section, the body section being bowed rearwardly, the body section having a notch, the body section and notch being substantially opposite the front member body section and notch, respectively; and a second downward extension having a substantially planar rear surface, the second downward extension and surface being substantially opposite the front member second downward extension and surface, respectively; the front member body section notch being mateable with the rear member body section notch such that the front and rear member body sections bias the front member second downward extension front surface against the rear member second downward extension rear surface, the body sections' notches being sized to allow each of the body sections to be squeezably displaced toward the other body section such that the second downward extensions' front and rear surfaces separate, the front and rear surfaces being forced together when the body sections are no longer squeezed.

In another embodiment, the first downward extensions are of sufficient length to allow the rear portion body section to touch the vertical surface without encountering the base.

In another embodiment, the front and rear member first downward extensions are spaced, such that each extension deforms toward the other when the body sections are squeezed.

There is provided, a device for grasping one or more paper sheets while suspended from a metal vertical surface, comprising: an elongated member; a magnetized base for attaching to the metal vertical surface, the base having blocks in a generally horizontal orientation for receiving the elongated member, such that the elongated member is generally horizontal; a loop positioned about the elongated member; a front member descending from the loop having: a first downward extension; a resilient body section, the body section being bowed frontwardly, the body section having a notch; and a second downward extension having a substantially planar front surface; a rear member descending from the loop having: a first downward extension, substantially opposite the front member first downward extension; a resilient body section, the body section being bowed rearwardly, the body section having a notch, the body section and notch being substantially opposite the front member body section and notch, respectively; and a second downward extension having a substantially planar rear surface, the second downward extension and surface being substantially opposite the front member second downward extension and surface, respectively; the front member body section notch being mateable with the rear member body section notch such that the front and rear member body sections bias the front member second downward extension front surface against the rear member second downward extension rear surface, the body sections' notches being sized to allow each of the body sections to be squeezably displaced toward the other body section such that the second downward extensions' front and rear surfaces separate, the front and rear surfaces being forced together when the body sections are no longer squeezed.

In another embodiment, the first downward extensions are of sufficient length to allow the rear portion body section to touch the vertical surface without encountering the base.

In another embodiment, the front and rear member first downward extensions are spaced, such that each extension deforms toward the other when the body sections are squeezed.

In another embodiment, the front and rear member first downward extensions are spaced, such that each extension deforms toward the other when the body sections are squeezed.

There is provided, a device for grasping one or more paper sheets while suspended from a metal vertical surface, comprising: an elongated member; means for attaching the elongated member to the vertical surface such that the elongated member is generally horizontal; a loop positioned about the elongated member; a front member descending from the loop having: a first downward extension; spring means front portion; and a second downward extension having a substantially planar front surface; a rear member descending from the loop having: a first downward extension, substantially opposite the front member first downward extension; spring means rear portion, the spring means rear portion being substantially opposite the spring means front portion; and a second downward extension having a substantially planar rear surface, the second downward extension and surface being substantially opposite the front member second downward extension and surface, respectively; the spring means front and rear portions cooperating to bias the front member second downward extension front surface against the rear member second downward extension rear surface, the cooperating spring means portions being adapted to be squeezably displaced such that the second downward extensions' front and rear surfaces separate, the front and rear surfaces being forced together when the spring means front and rear portions are no longer squeezed.

There is provided a device for grasping one or more paper sheets while suspended from a metal vertical surface, comprising: an elongated member; a magnetized base for attaching to the metal vertical surface, the base having blocks in a generally horizontal orientation for receiving the elongated member, such that the elongated member is generally horizontal; a loop positioned about the elongated member; a front member descending from the loop having: a first downward extension; a resilient body section, the body section being bowed frontwardly, the body section having a notch; and a second downward extension having a substantially planar front surface; a rear member descending from the loop having: a first downward extension, substantially opposite the front member first downward extension; a resilient body section, the body section being bowed rearwardly, the body section having a notch, the body section and notch being substantially opposite the front member body section and notch, respectively; and a second downward extension having a substantially planar rear surface, the second downward extension and surface being substantially opposite the front member second downward extension and surface, respectively; the first downward extensions being of sufficient length to allow the rear portion body section to touch the vertical surface without encountering the base; the front member body section notch being mateable with the rear member body section notch such that the front and rear member body sections bias the front member second downward extension front surface against the rear member second downward extension rear surface, the body sections' notches being sized to allow each of the body sections to be squeezably displaced toward the other body section such that the second downward extensions' front and rear surfaces separate, the front and rear surfaces being forced together when the body sections are no longer squeezed, the front and rear member first downward extensions being spaced such that each extension deforms toward the other when the body sections are squeezed.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Figure 1:
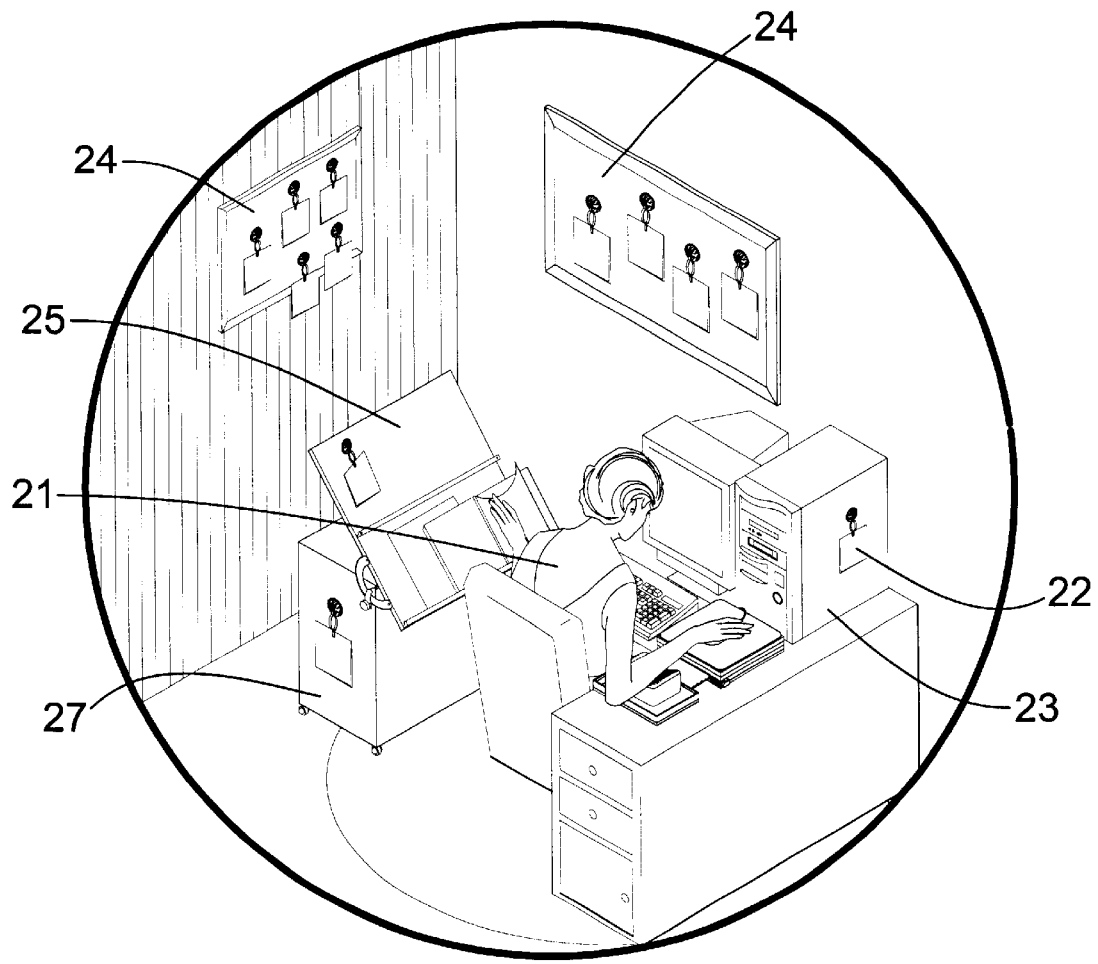
FIG. 1 is an illustrative view of the present invention in use on several magnetic surfaces.

Turning now descriptively to the drawings, in which similar reference characters denote similar elements throughout the several views, the figures illustrate the Suspended Note Clip of the present invention. With regard to the reference numerals used, the following numbering is used throughout the various drawing figures.

20 Suspended Note Clip of the present invention
21 user
22 paper sheet/note
23 metal computer tower surface
24 metal bulletin board surface
25 metal easel surface
27 metal file drawer surface
30 magnetized base
32 hinge pin block
34 hinge pin
40 front
42 rear
44 loop
50 front portion first downward extension
52 front portion body section
54 front portion body section notch
56 front portion second downward extension
58 front portion second downward extension front face
60 rear portion first downward extension
62 rear portion body section
64 rear portion body section notch
66 rear portion second downward extension
68 rear portion second downward extension rear face

DETAILED DESCRIPTION OF THE INVENTION

The following discussion describes in detail the preferred embodiments of the invention. This discussion should not be construed, however, as limiting the invention to those particular embodiments. Practitioners skilled in the art will recognize numerous other embodiments as well. For a definition of the complete scope of the invention, the reader is directed to the appended claims.

As shown in FIG. 1, the Suspended Note Clip 20 of the present invention is utilized by user 21 to smoothly, but firmly, grasp a paper note 22 or other paper sheet. The clip 20 is attached to any metal surface, such as the computer tower 23, bulletin board 24, easel 25, or file drawer 27, shown in FIG. 1.

Figure 2:
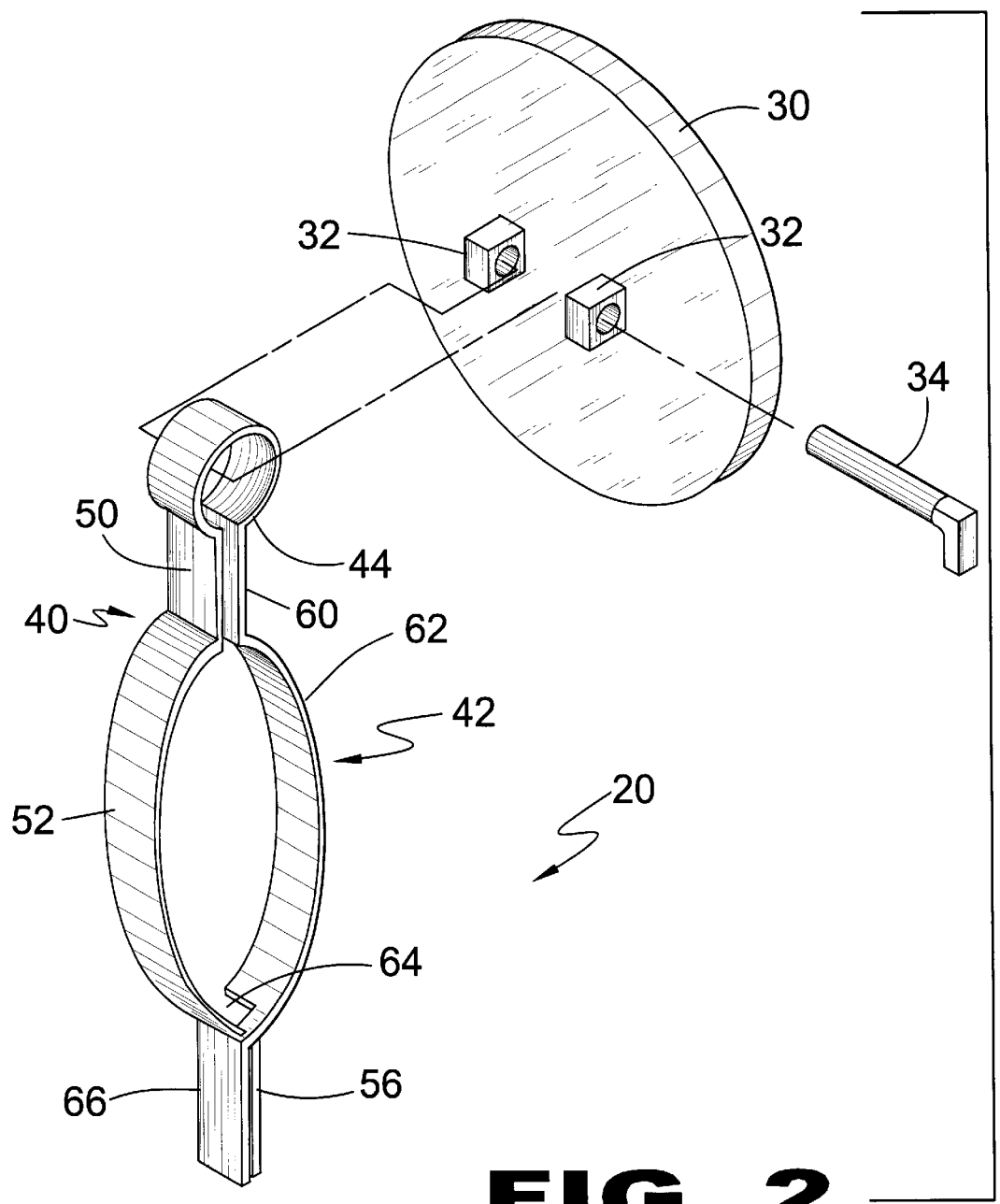
FIG. 2 is an exploded perspective view of the present invention with the hinge pin removed from the magnetic base.

As shown in FIGS. 2–8, there is one embodiment that has a magnetized base 30 with at least one planar side for attachment to the metal vertical surface. FIG. 2 shows the base 30 and the hinge pin blocks 32 that are positioned and aligned to receive the hinge pin 34.

Figure 3:
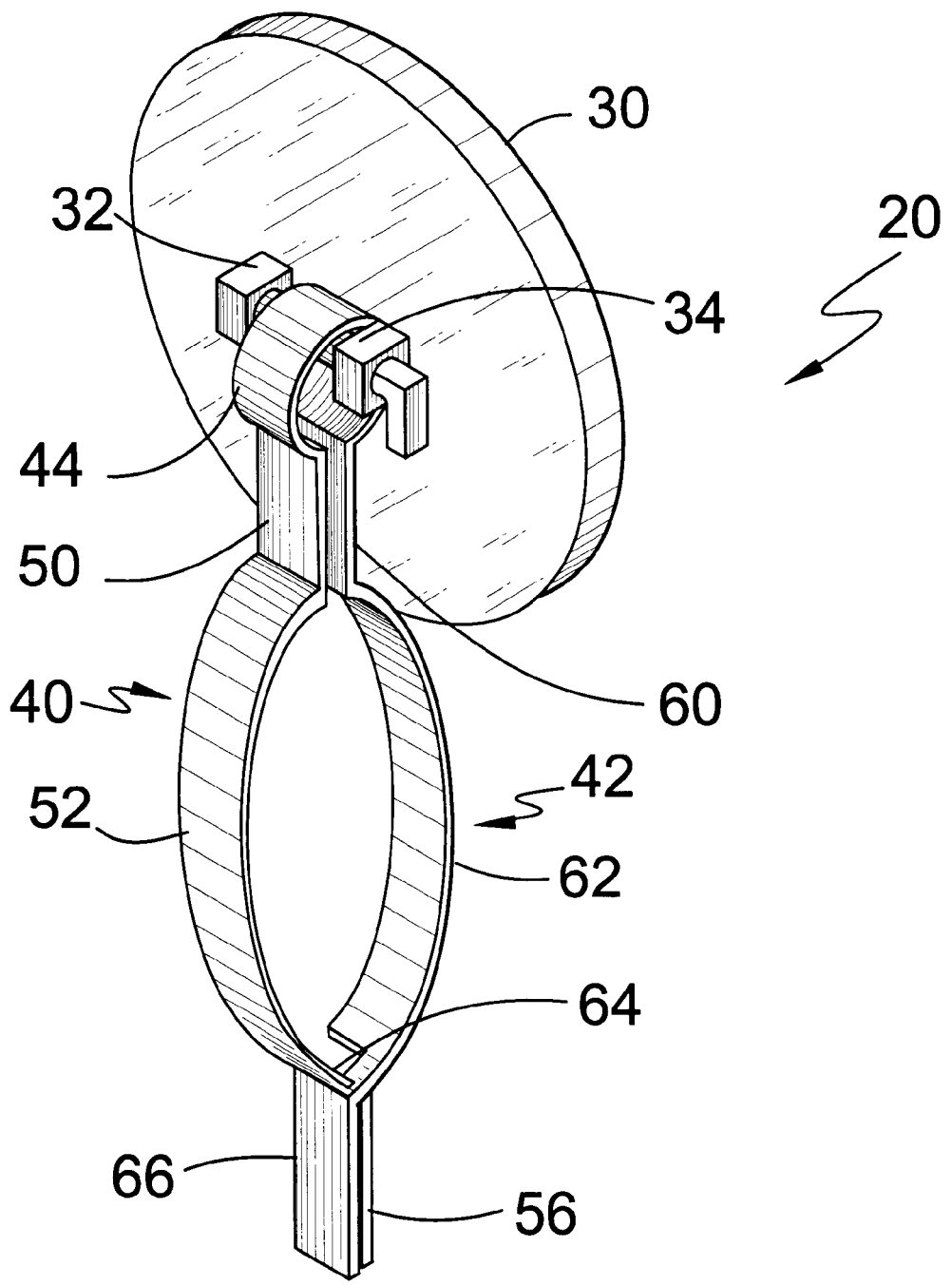
FIG. 3 is a perspective view of the present invention in its assembled state with a hinge pin inserted in the hinge blocks.

As shown in FIG. 3, the inserted hinge pin 34 is positioned in a generally horizontal position and is spaced apart from the base 30. A clip portion has a front portion 40, a rear portion 42 and a loop 44 that is suspended from the hinge pin 34. The hinge pin blocks 32 space the hinge pin 34 a sufficient distance from the base 30 to allow the loop 44 to rotate about the hinge pin 34.

Figure 4:
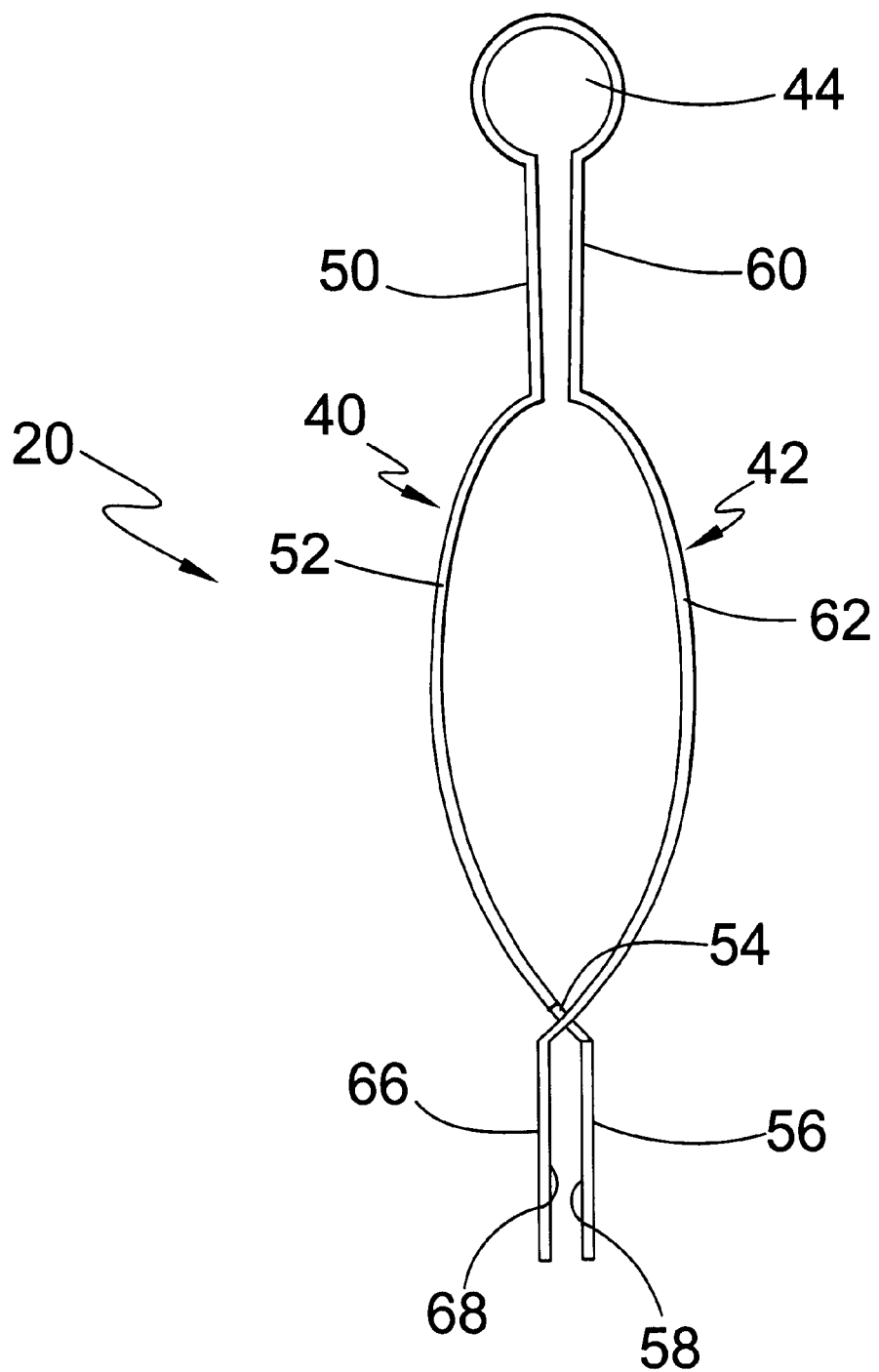
FIG. 4 is a side view of the present invention in an open position. closed position.
Figure 5:
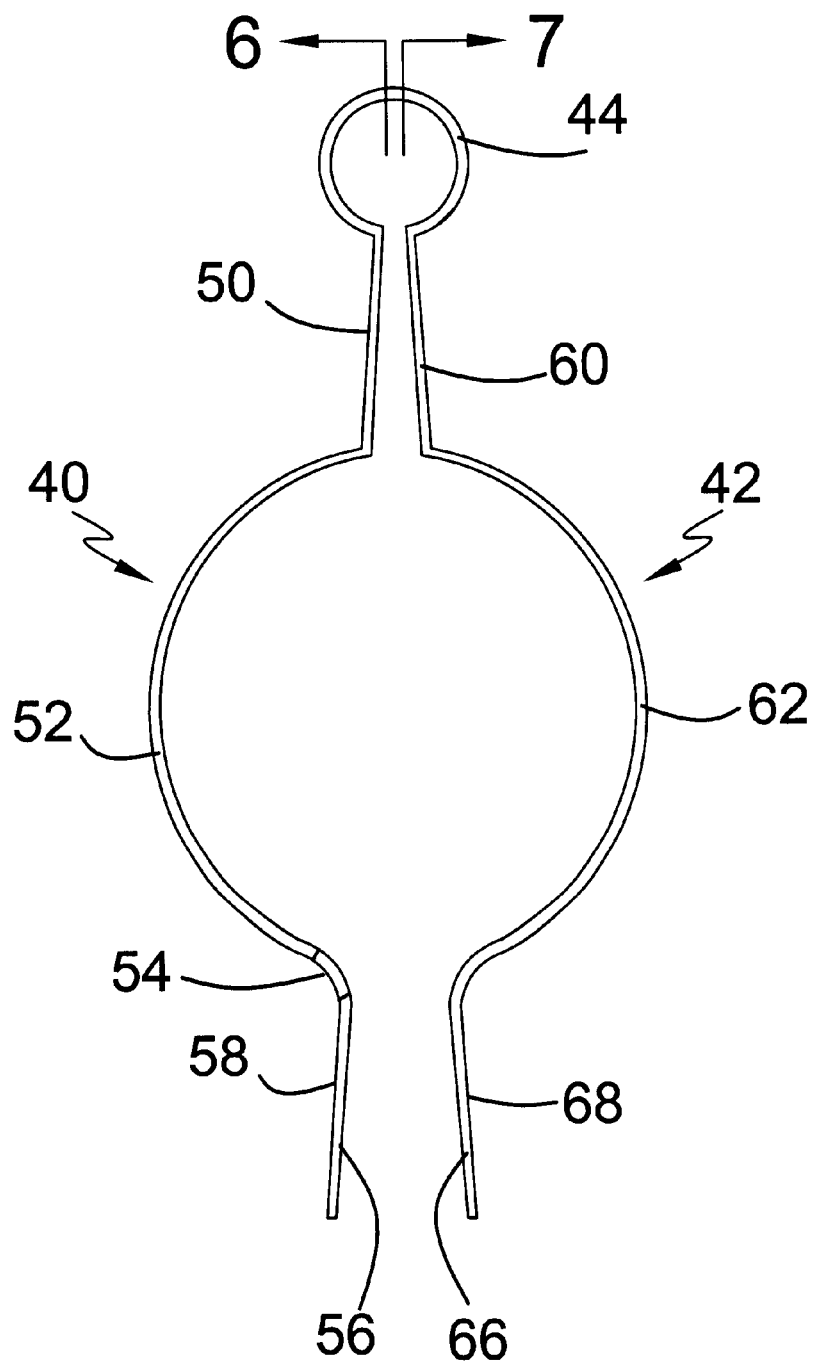
FIG. 5 is a side view of the present invention in an expanded position with the front and rear portion notches separated.
Figure 6:
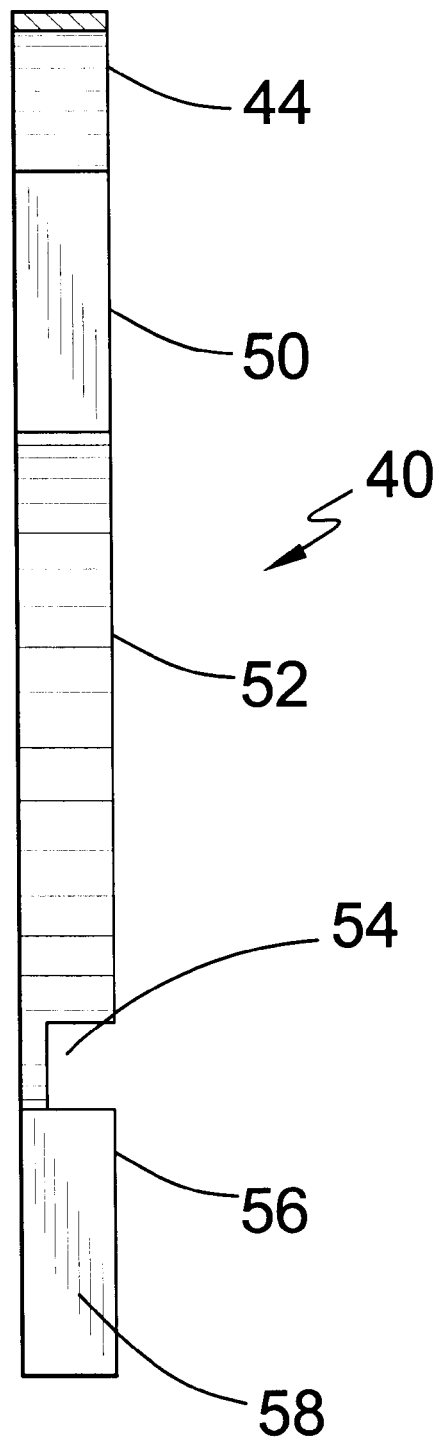
FIG. 6 is a front view present invention.

The front portion 40 has a resilient first downward extension 50 extending downwardly from the loop 44, and a resilient body section 52 attached to the first downward extension 50. The body section 52 is bowed frontwardly. The body section has a rectangular notch 54, as shown in FIGS. 4–5. Attached to the body section 52 is a second downward extension 56 that has a substantially planar front face 58, as shown in FIG. 4 and FIG. 6.

Figure 7:
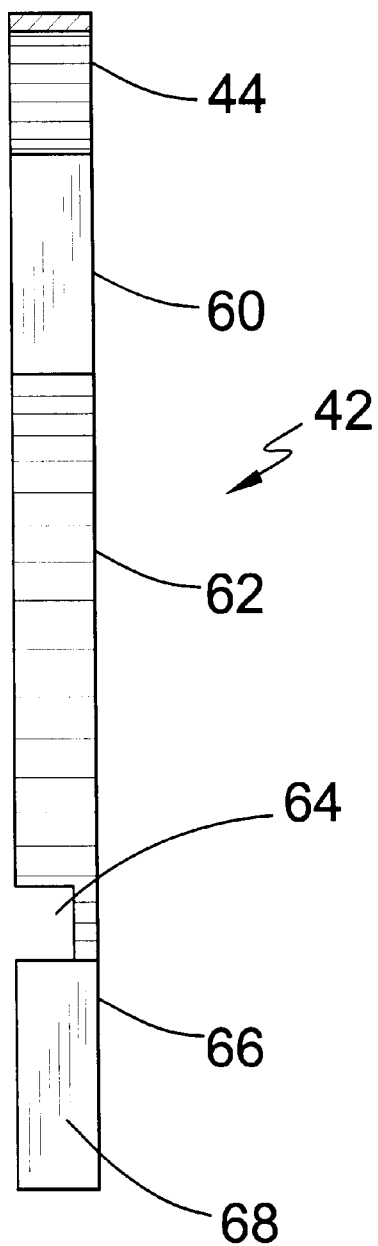
FIG. 7 is a rear view present invention.

In almost mirrored opposition to the front portion 40 is the rear portion 42, with similar components, including a first downward extension 60, a body section 62, a rectangular notch 64, and a second downward extension 66 having a planar rear face 68, as shown in FIG. 4 and FIG. 7.

Figure 8:
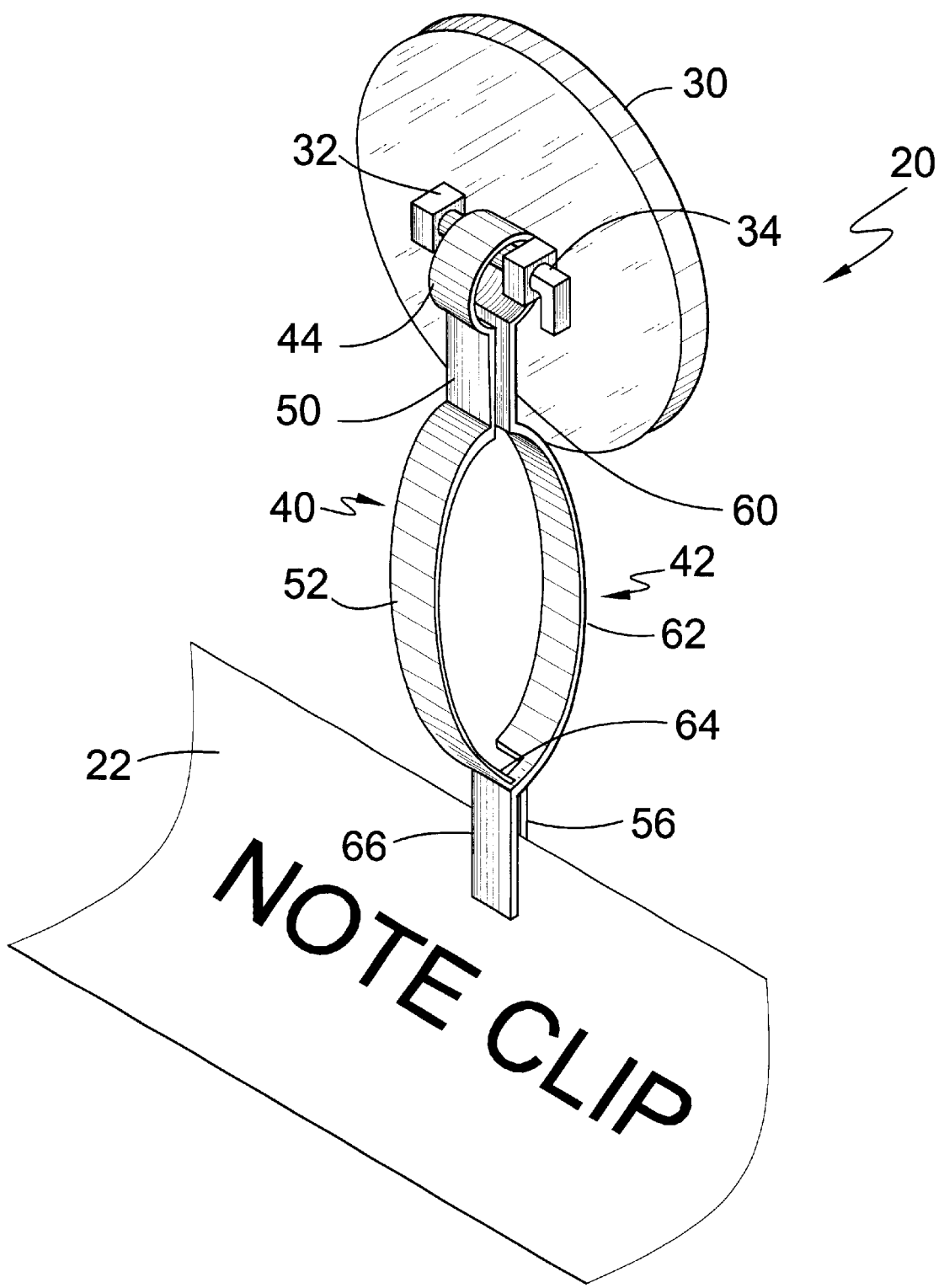
FIG. 8 is an illustrative view of the present invention with a paper note held flatly between the front and rear faces.

The notches 54,64 are aligned but oppositely turned for mating. The notches 54,64 have sufficient length to allow the second downward extensions 56,66 of both portions 40,42 to be spread apart when the body sections 52,62 are squeezed. As shown in FIG. 4 and FIG. 8, this separation also separates the front and rear faces 58,68, thus allowing one or more paper sheets 22 to be held flatly between the two second downward extensions 56,66.

As shown in FIG. 4, this separation is also assisted by the spacing between the first downward extensions 50,60 which allows the first downward extensions 50,60 to be displaced toward each other when the body sections 52,62 are squeezed by finger pressure.

The release of the squeeze pressure on the body sections 52,62 allows the spring characteristics of the bowed shape of the body sections 52,62 to again bias the front and rear faces 58,68 together, thus grasping the paper sheet 22. Because the faces 58,68 are planar, or substantially planar, the embossing and pinching effect, present in so many clips, is minimized.

In this embodiment 20, the first downward extensions 50,60 are of sufficient length to allow the rear portion body section 62 to touch the vertical surface 23 without encountering the base 30.

In use, the user 21 squeezes the front and rear body sections 52,62 to open the second downward extensions 56,66. A paper sheet 22 is then inserted between the second downward extensions 56,66. Upon cessation of squeezing the bowed body sections 52,62 the downward extensions 56,66 bias together to flatly and smoothly grasp the paper sheet 22.

With respect to the above description then, it is to be realized that the optimum material and dimensional relationships for the parts of the Suspended Note Clip 20, will include variations in size, materials, shape, and form, which will occur to those skilled in the art upon review of the present disclosure. For example, in various embodiments, the loop 42, front portion 40 and second portion are constructed from thin metal and various woods, metals and plastics, and the magnetized base 30 is constructed from the same materials with a magnetic backing, or as metal magnet in its entirety. All equivalent relationships to those illustrated in the drawings and described in the specification are intended to be encompassed by the present invention

What is claimed as new and desired to be protected by Letters Patent is set forth in the appended claims:

1. A clip for grasping one or more paper sheets, the clip freely, pivotally suspended on a generally horizontal member attached to a base attached to a vertical surface, comprising:
   a loop positioned about the horizontal member;
   a front member descending from the loop having:
      a first front downward extension;
      a front resilient body section, the front resilient body section being bowed frontwardly, the body section having a notch; and
      a second front downward extension having a substantially planar front surface;
   a rear member descending from the loop having:
      a first rear downward extension, substantially opposite the front member first downward extension;
      a rear resilient body section, the rear resilient body section being bowed rearwardly, the rear risiliant body section having a notch, the rear risilient body section and notch being substantially opposite the front member body section and notch, respectively; and
      a second rear downward extension having a substantially planar rear surface, the second rear downward extension and surface being substantially opposite the front member second downward extension and surface, respectively;
   the front member body section notch being mateable with the rear member body section notch such that the front and rear member body sections bias the front member second downward extension front surface against the rear member second downward extension rear surface, the body sections' notches being sized to allow each of the body sections to be squeezably displaced toward the other body section such that the second downward extensions' front and rear surfaces separate, the front and rear surfaces being forced together when the body sections are no longer squeezed.

2. The clip of claim 1, wherein the first downward extensions are of sufficient length to allow the rear member body section to touch the vertical surface without encountering the base.

3. The clip of claim 1, wherein the front and rear member first downward extensions are spaced, such that each extension deforms toward the other when the body sections are squeezed.

4. A device for grasping one or more paper sheets while suspended from a metal vertical surface, comprising:
   an elongated member;
   a magnetized base for attaching to the metal vertical surface, the base having blocks in a generally horizontal orientation for receiving the elongated member, such that the elongated member is generally horizontal;
   a loop positioned about the elongated member;
   a front member descending from the loop having:
      a first front downward extension;
      a front resilient body section, the front resilient body section being bowed frontwardly,
      the front resilient body section having a notch; and
      a second front downward extension having a substantially planar front surface;
   a rear member descending from the loop having:
      a first rear downward extension, substantially opposite the front member first downward extension;
      a rear resilient body section, the rear resilient section being bowed rearwardly, the rear resilient body section having a notch, the rear resilient body section and notch being substantially opposite the front member body section and notch, respectively; and
      a second rear downward extension having a substantially planar rear surface, the second rear downward extension and surface being substantially opposite the front member second downward extension and surface, respectively;
   the front member body section notch being mateable with the rear member body section notch such that the front and rear member body sections bias the front member second downward extension front surface against the rear member second downward extension rear surface, the body sections' notches being sized to allow each of the body sections to be squeezably displaced toward the other body section such that the second downward extensions' front and rear surfaces separate, the front and rear surfaces being forced together when the body sections are no longer squeezed.

5. The clip of claim 4, wherein the first downward extensions are of sufficient length to allow the rear portion body section to touch the vertical surface without encountering the base.

6. The clip of claim 4, wherein the front and rear member first downward extensions are spaced, such that each extension deforms toward the other when the body sections are squeezed.

7. A device for grasping one or more paper sheets while suspended from a metal vertical surface, comprising:
   an elongated member;
   means for attaching the elongated member to the vertical surface such that the elongated member is generally horizontal;

a loop freely pivotal about the elongated member;
a front member descending from the loop having:
- a first front downward extension;
- a spring means front portion; and
- a second front downward extension having a substantially planar front surface;

a rear member descending from the loop having:
- a first rear downward extension, substantially opposite the front member first downward extension;
- a spring means rear portion, the spring means rear portion being substantially opposite the spring means front portion; and
- a second rear downward extension having a substantially planar rear surface, the second rear downward extension and surface being substantially opposite the front member second downward extension and surface, respectively;

the spring means front and rear portions cooperating to bias the front member second downward extension front surface against the rear member second downward extension rear surface, the cooperating spring means portions being adapted to be squeezably displaced such that the second downward extensions' front and rear surfaces separate, the front and rear surfaces being forced together when the spring means front and rear portions are no longer squeezed.

8. A device for grasping one or more paper sheets while suspended from a metal vertical surface, comprising:

an elongated member;
a magnetized base for attaching to the metal vertical surface, the base having blocks in a generally horizontal orientation for receiving the elongated member, such that the elongated member is generally horizontal;
a loop positioned about the elongated member;
a front member descending from the loop having:
- a first front downward extension;
- a front resilient body section, the body section being bowed frontwardly, the front resilient body section having a notch; and
- a second front downward extension having a substantially planar front surface;

a rear member descending from the loop having:
- a first rear downward extension, substantially opposite the front member first downward extension;
- a rear resilient body section, the rear resilient body section being bowed rearwardly, the rear resilient body section having a notch, the rear resilient body section and notch being substantially opposite the front member body section and notch, respectively; and
- a second rear downward extension having a substantially planar rear surface, the second rear downward extension and surface being substantially opposite the front member second downward extension and surface, respectively;

the first downward extensions being of sufficient length to allow the rear portion body section to touch the vertical surface without encountering the base;

the front member body section notch being mateable with the rear member body section notch such that the front and rear member body sections bias the front member second downward extension front surface against the rear member second downward extension rear surface, the body sections' notches being sized to allow each of the body sections to be squeezably displaced toward the other body section such that the second downward extensions' front and rear surfaces separate, the front and rear surfaces being forced together when the body sections are no longer squeezed, the front and rear member first downward extensions being spaced such that each extension deforms toward the other when the body sections are squeezed.

\* \* \* \* \*